United States Patent [19]

Hurley et al.

[11] Patent Number: 4,716,074

[45] Date of Patent: Dec. 29, 1987

[54] POROUS FIBROUS FLUOROCARBON STRUCTURES

[75] Inventors: John L. Hurley, Mahwah, N.J.; Joseph D. Puzo, Cortland; Rosa F. Tingey, Ithaca, both of N.Y.

[73] Assignee: Pall Corporation, Glen Cove, N.Y.

[21] Appl. No.: 827,537

[22] Filed: Feb. 10, 1986

[51] Int. Cl.$^4$ .................... B32B 27/00; D04H 1/64
[52] U.S. Cl. .................... 428/220; 264/127; 264/128; 264/331.14; 428/272; 428/372; 428/421; 428/422
[58] Field of Search ........... 428/421, 422, 332, 290, 428/272, 402, 220, 372; 427/389.8, 244; 156/187; 264/128, 127, 331.14; 162/157.2, 157.5

[56] References Cited

U.S. PATENT DOCUMENTS

| | | | |
|---|---|---|---|
| 2,936,301 | 5/1960 | Thomas et al. | 428/402 |
| 2,971,877 | 2/1961 | Arledter | 162/101 |
| 3,010,536 | 11/1961 | Plurien et al. | 427/244 X |
| 3,015,604 | 1/1962 | Hochberg | 162/157.5 |
| 3,186,897 | 6/1965 | Hochberg | 428/296 |
| 3,528,879 | 9/1970 | Kometani | 162/157.5 |
| 3,928,703 | 12/1975 | Cook | 428/422 X |
| 4,131,711 | 12/1978 | Attwood | 428/332 |
| 4,169,754 | 10/1979 | Perrotta | 156/187 |
| 4,210,697 | 7/1980 | Adiletta | 428/272 |
| 4,344,999 | 8/1982 | Gohlke | 428/316.6 X |
| 4,386,041 | 5/1983 | Takagi | 264/128 |
| 4,504,528 | 3/1985 | Zucker et al. | 427/389.8 |
| 4,640,866 | 2/1987 | Suzuki | 428/422 |

Primary Examiner—Thomas J. Herbert
Attorney, Agent, or Firm—Leydig, Voit & Mayer

[57] ABSTRACT

Porous, fibrous structures comprising polytetrafluoroethylene fibers in a fluorocarbon binder are prepared by laying down a stabilized dispersion of the fibers, stabilizing agent, and liquid carrier on a support, removing at least a portion of a liquid carrier, preferably drying the laydown, applying an emulsion of a fluorocarbon binder to the laydown and curing the fluorocarbon binder. The resulting structures have void volumes of from about 40 to about 99 percent, strengths of from about 200 to about 6,000 grams per inch of width, and air pressure drops of from about 0.0025 to about 0.1 inch of water at a flow rate of 28 standard cubic feet per minute per square foot of the fibrous structure.

24 Claims, No Drawings

POROUS FIBROUS FLUOROCARBON STRUCTURES

TECHNICAL FIELD

This invention relates to porous, fibrous fluorocarbon structures and methods for their manufacture. More particularly, this invention relates to porous, fibrous polytetrafluoroethylene structures with good structural integrity in hostile chemical environments and finding particular use as support and drainage material for all fluorocarbon polymer filters.

BACKGROUND ART

Although porous, fibrous fluorocarbon structures are used in a variety of applications, the demands placed upon such structures are particularly severe in certain filtration applications. For example, filter structures may be exposed to very hot liquids which may be highly acidic or strongly caustic. Fluorocarbon polymers, particularly polytetrafluoroethylene, are, in large measure, unaffected by such conditions, but conventional binders are not. Accordingly, if conventional binders are used to form fibrous fluorocarbon structures, once the binder decomposes, the structural integrity of the fibrous structure is destroyed.

Fluorocarbon polymer resins are not readily dispersed, and conventional dispersion methods do not produce a fiber dispersion sufficiently uniform or stable to produce a laydown with a uniform distribution of fibers. Additionally, fluorocarbon resins do not readily adhere to fluorocarbon fibers. It is difficult, therefore, to ensure that adequate amounts of binder remain in the laydown after drainage and drying when the binder is admixed into the fiber dispersion. Further, it is difficult to provide uniform distribution of the binder, throughout the structure, and, concomitantly, a structure with uniform strength.

Fluorocarbon polymers also tend to shrink when heated. This shrinkage tends to exacerbate the problem of poor structural integrity of the formed structures due to inadequate amounts and non-uniform distribution of binder in the laydown since, upon shrinking of the individual fibers, the structure tends to be disrupted and pulled apart.

This invention is directed to porous, fibrous fluorocarbon structures comprising polytetrafluoroethylene fibers and a fluorocarbon binder, which structures have increased structural integrity and enhanced and more uniform properties by virtue of a more uniform distribution of fiber and binder. It is directed further to such structures which are suitable for use as a support or a drainage layer in composite filter structures. It also is directed to a method for forming such structures.

DISCLOSURE OF THE INVENTION

This invention is directed to porous, fibrous structures comprising polytetrafluoroethylene (PTFE) fibers and a fluorocarbon binder and a method of making such structures, which method comprises:

(a) preparing a stabilized dispersion comprising PTFE fibers, a stabilizing agent, and a liquid carrier;

(b) laying down the dispersion on a support and removing at least a portion of the liquid carrier;

(c) applying an emulsion of a fluorocarbon binder to the laydown; and (d) curing the fluorocarbon binder.

A preferred embodiment of the subject invention is directed to a method of forming a porous, fibrous structure comprising PTFE fibers and a fluorocarbon binder, which method comprises:

(1) thermally bleaching the PTFE fibers prior to incorporation into the dispersion to shrink the fibers;

(2) preparing a stabilized aqueous-based dispersion comprising the bleached, pre-shrunk PTFE fibers and a stabilizing agent in water;

(3) laying down the dispersion on a support;

(4) at least partially drying the laydown;

(5) applying an emulsion of a fluorocarbon binder to the laydown;

(6) drying the laydown;

(7) curing the fluorocarbon binder; (steps (6) and (7) can be combined together)

(8) preferably repeating steps (5) and (6) (preferably prior to carrying out the curing step (7)) one or more times to increase uniformity of FEP concentration through the medium; and (9) treating the cured laydown to remove extractables by, e.g., treatment with nitric acid at elevated temperature followed by rinsing with pure water and drying of the structure.

This invention also is directed to porous, fibrous structures with good structural integrity comprising fluorocarbon polymer fibers and a fluorocarbon binder, said structures having void volumes of from about 40 to about 99%, strengths of from about 200 grams per inch of width to about 6,000 grams per inch of width, and air pressure drops of from about 0.0025 to about 0.1 inch of water at a flow rate of 28 standard cubic feet per minute per square foot of the fibrous structure.

BEST MODE FOR CARRYING OUT THE INVENTION

Suitable polytetrafluoroethylene (PTFE) fibers for use in the subject invention typically will have diameters ranging from about 5 to about 50 micrometers, preferably from about 15 to about 35 micrometers, and will have lengths ranging from about 1,000 to about 20,000 micrometers, preferably from about 4,500 to about 8,500 micrometers. Fibers outside those ranges can be used, but with less success. For example, fibers having diameters greater than about 50 micrometers and longer than about 20,000 micrometers cannot be used to form relatively thin material. Unless relatively thick material is desired, the fibers should not exceed those dimensions. Also, where the aspect ratio (ratio of length to diameter) is lower than about 100, there will be insufficient crossing and interlacing among the fibers to provide the requisite strength in the resulting material. Accordingly, fibers with aspect ratios of at least about 100 should be used. If the fibers have diameters less than about 5 micrometers, they (1) tend to break up during dispersion, thereby decreasing their aspect ratio and yielding a material having reduced void volume as well as reduced strength and (2) tend to have high resistance to flow of liquids.

PTFE fibers of the desired type are commercially available, e.g., from E. I. DuPont de Nemours and Company, Inc.

Fluorocarbon Binder

The preferred fluorocarbon polymer binders are fluorinated ethylene-propylene copolymers, particularly copolymers of tetrafluoroethylene and hexafluoropropylene (FEP). Others may be used so long as they exhibit the desired resistance to high temperatures and caustic chemical environments and provide the requisite bonding of the PTFE fibers upon curing. As noted, FEP is the preferred fluorocarbon polymer binder. A particularly preferred FEP fluorocarbon polymer binder is FEP 120 available from E. I. DuPont de Nemours and Company, Inc.

As discussed above, the fluorocarbon binder must set or cure before any substantial shrinkage or melting of the PTFE fibers occurs. For this reason, thermoplastic fluorocarbon binders, such as fluorinated ethylene-propylene polymers, are preferred. As used herein, the term "set" or "cure" simply refers to the binder taking on the desired configuration on the fibers to provide the desired structural integrity. With a thermoplastic resin like FEP, the setting or curing is simply the flowing of the resin over the fibers to coat them and adhere one fiber to another at crossover points The concentration of the fluorocarbon binder (weight percent solids) in the emulsion as supplied is typically in the range of from about 45 to about 65 weight percent. The particles of the fluorocarbon polymer binder in the emulsion typically have sizes in the range of from about 0.05 to about 1.0 micrometer, preferably 0.1 to about 0.4 micrometer. The dispersions are aqueous and typically contain from 3 to 12%, more typically 5 to 7%, by weight of volatile nonionic and anionic wetting agents. The dispersions are generally diluted before use, typically to 0.5 to 25% by weight or higher, more preferably from about 5 to about 15% by weight, of the fluorocarbon binder by adding water.

Bleaching Of Fibers

Because of carbonaceous residues remaining from their manufacture, staple PTFE fibers are typically a rich, chocolate brown color. Aesthetically, this is undesirable in filters as well as in filter support and drainage structures.

Bleaching as used herein with reference to the fibers refers to a process of removing the carbonaceous residues which may typically be present in amounts as high as about 9 weight percent of the staple fibers. If not removed, those residues remain in the filter structure as extractables, i.e., materials which can leach from the filter structure during use. In the electronics industry, for example, etching solutions used in microchip manufacture must be very pure, and carbonaceous extractables cannot be tolerated. Thus, for such applications, and others where contamination by carbonaceous extractables must be avoided, bleaching of the fluorocarbon fibers is preferred.

Bleaching may be accomplished by chemical means, e.g., by heating the fibers in concentrated sulfuric acid heated to approximately 600° F. to which is added slowly concentrated nitric acid until the fibers turn white.

Thermal bleaching, however, is preferred. Thermal bleaching may be accomplished, e.g., by gradually increasing the temperature of the fibers in an air environment over an extended period of time from, for example, about 450° F. up to about 570° F. and maintaining such temperature for several hours until the fibers are substantially free of carbonaceous material and are white in color and have a more aesthetically desirable appearance. Thermal bleaching will typically result in a shortening of the fibers and an increase in their diameter. Depending on the desired size of the fibers in the formed structure, the fibers can be chopped to the desired length before or after their thermal bleaching, it being recognized that they will be reduced in length during the thermal bleaching step.

Pre-Shrinking Of Fibers

Preferably, the fibers are pre-shrunk before preparation of the dispersion. Pre-shrinking obviates tearing or wrinkling of the laydown caused by shrinkage which otherwise can occur during the drying and/or curing steps. Shrinking results in shorter fibers having larger diameters. The fibers may be pre-shrunk by heating them, preferably by ramping the temperature to which they are subjected over time. For example, the fibers can be heated to about 470° F. with the temperature increased every four hours until a temperature of about 570° F. is reached and then holding them at 570° F. for several hours. This procedure not only shrinks the fibers but also serves to bleach them from their chocolate brown color to a lighter, white color. Accordingly, heat treatment can serve to both bleach and shrink the fibers. As noted previously, the fibers can be cut to a desired length, e.g., 0.25 inch, after thermal treatment.

Stabilized Dispersion

The stabilized dispersion used to prepare the porous structures in accordance with this invention is comprised of a liquid carrier medium, the PTFE fibers, and a stabilizing agent. Preferably, a single constituent serves to both stabilize the dispersion of PTFE fibers and, upon drying, to bind the fibers to each other, thereby providing green strength.

Typically, the stabilized dispersion is prepared by the following general procedure.

The stabilizing agent is combined with the liquid carrier medium, preferably water for ease of use and disposal, in an amount such as to provide the requisite concentration of the stabilizing agent in the liquid medium. The combination is mixed until uniform dispersion of the stabilizing agent is obtained. The requisite amount of PTFE fibers is then added and mixed to provide a uniform dispersion or suspension of the fibers in the liquid medium.

For some systems, this is all that is required. The suspension of PTFE fibers in the liquid medium containing the stabilizing agent is stable after a thorough mixing has been completed. By stable or stabilized is meant that the PTFE fibers are in suspension and will not settle out at a rate fast enough to adversely affect the laydown of the dispersion.

For some applications it is preferred to add an additional component to set up the stabilizing agent and thereby increase the viscosity. For example, with Carbopol 941 (a polyacrylic acid available from B. F. Goodrich Chemicals Company), the addition of a neutralizing base, ammonium hydroxide, serves to neutralize the polyacrylic acid and increase the viscosity substantially, e.g., to about 800 to 20,000 centipoise. Such systems are very thixotropic, i.e., they have a very high apparent viscosity when undisturbed (low shear condition) and hence settling of the suspended particulate is retarded. When vigorously agitated, they have a low effective viscosity and, hence, are very effective in dispersing the PTFE fibers. Since these dispersions are very stable, they may be prepared in advance of the time they are used without settling out of the fibers.

Carbopol 941 may be used without the addition of a neutralizing base, albeit addition of a neutralizing base is preferred. When a neutralizing base is not used, more of the Carbopol must be added to achieve the desired viscosity. Viscosities in the range of from about 800 to about 20,000, preferably in the range of 1,200 to 6,000, centipoise may be used, measured at the temperature of application on a portion of the liquid from which the fibers have been removed using a Brookfield viscometer.

As noted, a stabilizing agent is necessary to stabilize the fiber dispersion. Also, a fugitive binder is usually desirable to give the laydown sufficient strength to withstand handling until curing of the fluorocarbon binder is effected. Both the stabilizing agent and the fugitive binder, if used, preferably are fugitive in the sense that they are volatilized and/or decomposed substantially completely prior to or during drying and curing of the porous structure so that they are essentially absent from the finished fibrous structure. Alternatively, however, they may be of such a type that they are removed by subsequent treatment, for example, as described below. In any event, they should be volatilized, decomposed or removed so that they do not increase the level of extractables in the finished fibrous structure.

Although separate components may be used, preferably a single component will act as both a fugitive stabilizer and fugitive binder, i.e., as a fugitive stabilizer/binder. Preferred materials are polyacrylic acids marketed by B. F. Goodrich Chemical Company under the trademark Carbopol, particularly Carbopol 934, Carbopol 940, and Carbopol 941. As noted, the thickening action of these polyacrylic acids is enhanced considerably by the addition of a neutralizing base, such as ammonium hydroxide.

The amount of PTFE fibers present in the stabilized dispersion should be such that a uniform and complete dispersion is achieved with the minimum amount of water. Generally from about 0.5 to about 20, and preferably from about 1 to about 5, grams of fibers per liter of the dispersion comprising the stabilizing agent, liquid carrier, and fiber mixture is satisfactory. Lower amounts can be used, but are less economical. Higher amounts are more difficult to disperse and may lead to clumping or aggregation of the fibers and a non-uniform laydown.

The amount of stabilizing agent/binder will vary according to the particular agent chosen, but in every case it should be sufficient to provide a stabilized dispersion as described above. Typically, mixtures of the liquid medium and stabilizing agent will have viscosities of from about 800 to about 20,000, and preferably from about 1,200 to about 6,000, centipoise, prior to incorporation of the fibers. Generally from about 0.4 to about 4 grams per liter of the stabilizing agent/binder and, preferably, from about 1 to about 2 grams per liter of the liquid carrier and stabilizing agent/binder mixture are sufficent.

The dispersion may be prepared with conventional equipment, e.g., a baffled Cowles mixer or beater. Generally, beating at a tip speed of from about 3,000 to about 4,500 feet per minute for from about 30 to about 120 minutes is sufficient to produce a uniform, complete dispersion of the fibers. Excessive tip speed and mixing times are not desirable due to a loss in viscosity caused by shearing of the molecules of the stabilizing agent. The surface tension of solutions of the desired characteristics which have been thickened with Carbopol is above 70 dynes per centimeter and was measured as 74.2 dynes per centimeter for a 1.4 grams per liter of Carbopol 941 mixture.

Laying Down The Dispersion

The stabilized dispersion may be laid down on any suitable porous support, e.g., a woven glass cloth or wire mesh. The laydown should be of uniform thickness and spreading means may be employed for that purpose. Excess liquid carrier then is drained from the laydown, preferably by drawing a vacuum through the support. Conventional equipment, such as a Fourdrinier, may be used. To avoid premature and uneven drainage of the laydown, an impervious sheet, such as a plastic sheet, may be placed over the porous support prior to laydown of the dispersion. After distribution of the dispersion over the support, the plastic sheet is removed and the liquid is drained.

Drying The Laydown

Preferably, the laydown is dried substantially completely prior to application of the fluorocarbon polymer binder. Drying may be accomplished by drawing ambient or warmed air through the laydown, by infrared radiation or with conventional oven equipment. With an infrared heater, 6 to 9 minutes is satisfactory when operated at about 6 watts per square inch of the fibrous structure laydown at a distance of 3 to 4 inches.

Applying The Fluorocarbon Binder To The Laydown

The fluorocarbon binder emulsion may be applied to the laydown by spraying, dipping, or other conventional techniques. The amount of fluorocarbon binder emulsion applied will vary according to the concentration of the fluorocarbon binder in the emulsion. The concentration of the emulsion and the amount of emulsion applied to the laydown, whether in a single application or, as described below, in multiple applications, must be such that sufficient amounts of fluorocarbon binder are provided to ensure adequate bonding of fiber-to-fiber contacts to impart structural integrity to the fibrous structure.

In general, if distributed substantially uniformly, fluorocarbon binder amounts in the final product, i.e., the porous fibrous structure, of from about 5 to about 45, preferably from about 10 to about 35, weight percent based on the weight of fibers, are sufficient. Amounts below 5 weight percent may be used, however, when less binding is required. Generally, amounts greater than 45 weight percent will lead to webbing, that is, the formation of polymer films from fiber to fiber in areas not immediately adjacent those areas in which the fibers contact each other, with concomitant undesirable increases in pressure drop through the structure. Thus, unless the formation of a continuous polymer matrix is desired, generally this upper limit should not be exceeded.

Drying The Laydown

Preferably, the impregnated laydown is again dried after application of the fluorocarbon binder emulsion in the manner described above. Drying can be accomplished as a separate step but can also be combined with the curing of the binder.

Setting Or Curing The Fluorocarbon Binder

The fluorocarbon impregnated structure is cured by heating at a higher temperature than is required for drying. For thermoplastic fluorocarbon binders the curing temperature and time should be such that the fluorocarbon binder is allowed to melt and flow, thereby enhancing the fiber-to-fiber bonding. For example, when fluorinated ethylene-propylene polymers are used, setting or curing will be carried out typically at from about 515 to about 650° F. for from about 20 seconds to about 1 minute.

In every case the curing temperature used should be the minimum necessary to cure the fluorocarbon binder, i.e., for the binder to flow and melt bond the fibers one to another. To the extent that such minimum temperatures are exceeded, there is the potential for undesirable shrinkage or melting of the fluorocarbon fibers During drying, the fluorocarbon binder emulsion tends to wick toward the heat-exposed side of the laydown. Such wicking, especially when the laydown is relatively thick, can lead to binder-starved areas where the fibers are either unbonded or only weakly bonded. Preferably, therefore, the application step and the drying step are repeated one or more times prior to curing, and preferably after stripping the porous support and turning the laydown over so that the previously unexposed side is exposed to more thoroughly and uniformly impregnate the laydown with fluorocarbon binder. The temperature can be raised enough to cure or set the binder between impregnation steps.

Treating Laydown To Remove Extractables

The stabilizing agent, and fugitive binder if used, as well as any residual surfactant from the fluorocarbon dispersion should not increase the level of extractables in the resulting fibrous structure. To the extent that extractables are present they are preferably removed, for example, by treating the cured laydown with a heated mineral acid, such as 70% reagent grade nitric acid at 230 to 250° F. for five hours followed by rinsing with pure water and drying of the structure.

The porous fibrous structures in accordance with the subject invention comprise polytetrafluoroethylene fibers and a fluorocarbon binder with structural integrity resulting from the curing of a fluorocarbon binder on a laydown of the polytetrafluoroethylene fibers. The structures have weights ranging from about 1 or 2 grams per square foot up to as much as about 80 grams per square foot, preferably from about 3 to about 25 grams per square foot, more preferably from about 4 to about 14 grams per square foot, void volumes in the range of from about 40 to about 99%, preferably in the range of from about 50 to about 95%, strengths in the range of from about 200 to about 6,000 grams per inch of width, preferably from about 500 to about 2,500 grams per inch of width, thicknesses typically ranging from about 3 to about 45 mils, more preferably from about 5 to about 20 mils, and air pressure drops of from about 0.0025 to about 0.1 inch water at a flow rate of 28 standard cubic feet per minute per square foot of the fibrous structure.

They find particular use as support and drainage medium for all fluoropolymer filter media which must be capable of withstanding hostile chemical environments including both caustic and acid environments at elevated temperatures. When used as support and drainage material, e.g., as upstream and downstream layers of a fluorocarbon polymer in a pleated allfluorocarbon polymer filter cartridge, the flow characteristics of the porous fibrous structures in accordance with this invention must be considered as well as the stiffness of the structure and the related thickness and weight per square foot.

For structures in accordance with the invention, it has been found that increasing the weight of the medium per square foot makes it more resistant to deflection or deformation because of the increasing thickness. Offsetting this desirable result is the reduced number of pleats which can be fitted into a cartridge as the thickness of the support and drainage layers is increased. It has also been observed that the intrinsic stiffness as measured by Youngs modulus was relatively constant as the thickness and corresponding weight of the structure increased, i.e., the ration of stress to strain as the material is deformed under a load is relatively constant for material of varying thickness. This is shown in Table I below.

TABLE I

|  | Light Weight Material | Intermediate Weight Material | Heavier Weight Material |
|---|---|---|---|
| Weight (grams/ft$^2$) | 4.14 | 8.03 | 13.50 |
| Thickness (mils) | 7.5 | 13.8 | 21.6 |
| (Deflection* for Cantilever Length of: |  |  |  |
| 1 inch | 0.153 | 0.04 | 0.0243 |
| 2 inches | 1.48 | 0.643 | 0.217 |
| Calculated* Youngs |  |  |  |
| Modulus (psi) | 1951 | 1749 | 1794 |
| Average |  | 1831 |  |
| Void Volume (%) | 89.1 | 88.5 | 87.7 |

*Deflection was measured for cantilevered lengths of one and two inches and the Youngs modulus calculated for each deflection and the two values were then averaged. The weight of the specimen caused its deflection, i.e., no external force was applied.

The Youngs moduli for the three materials of varying weight and thickness were relatively constant, i.e., they did not vary by more than about 200 psi.

The cross flow characteristics of the porous structure are also important when it is to be used as support and drainage material. A typical porous structure in accordance with this invention, i.e., a structure having a weight of 8.03 grams per square foot and the thicknesses shown, had the cross flow rates for liquid and air as set out below in Table II.

TABLE II

| Thickness* of One Layer (mils) | Liquid** Cross Flow (cc/min/psi) |
|---|---|
| 12.5 | 30.5 |
| 8.0 | 7.0 |
| 6.0 | 5.4 |

*The medium was initially compressed slightly from 13.8 mils to 12.5 mils to avoid experimental error since slight compression insures that all the liquid passes through the medium. Other samples of the 8.03 grams per square foot material were compressed to 8.0 and 6.0 mil thicknesses since normal corrugations would typically yield about an 8.0 mil thick medium. These cross flow rates obtained are adequate for both the 8.0 mil and 6.0 mil thicknesses. Typically, a minimum liquid cross flow of about 2.5 cc/min/psi is adequate.
**The liquid used was isopropyl alcohol having a viscosity of 2.1 centipoise.

Air flow results were as follows:

| Thickness of One Layer (mils) | Air Flow (cc/min/psi) | Void Volume (%) |
|---|---|---|
| 12.5 | 3540 | 87.3 |
| 8.0 | 1480 | 80.0 |

Air cross flows of at least about 500 cc/min/psi are desirable, more preferably about 1,000 cc/min/psi or greater. Liquid cross flows (isopropyl alcohol) of at least about 2.5 cc/min/psi are desired, more preferably about 4 cc/min/psi or greater.

The invention will be better understood by reference to the following examples which are offered by way of illustration.

EXAMPLE 1

Polytetrafluoroethylene fibers one-quarter of an inch in length and having diameters of about 23.7 micrometers were thermally bleached by heating them to a temperature of 470° F. where they were held for four hours following which the temperature was increased by ten degrees every four hours until 570° F. was reached. The fibers were held at 570° F. until they were white. After this thermal bleaching treatment, the fiber diameter had increased to 25.4 micrometers (a 6.86% increase in fiber diameter) and the fiber length had decreased to 0.180 inches (a 28% decrease in fiber length).

Separate dispersions having 2.24 grams of fiber per liter and 1.4 grams of Carbopol 941 per liter, to which 0.06 milliliter of 29% by weight aqueous ammonium hydroxide was added per liter, were prepared from fibers that had not been thermally treated and from fibers that had been thermally treated as described above. Separate laydowns of the two dispersions at a level of 10 grams of fibers per square foot were made on a support of glass cloth covered with a plastic sheet which was removed after distribution of the dispersion over the support. The laydowns were about 4 feet long by 5 inches wide.

After they were dried under an infrared heat source, the laydowns were sprayed with a dispersion of FEP 120 dispersion in water having a concentration of 11% by weight FEP 120. They were then dried under an infrared heat source. The laydowns were then turned over and sprayed and dried in the same manner a second time.

The dried laydowns (still on the glass cloth) were then passed through a laboratory belt furnace set at 600° F. The length of the heated zone was 8 feet and residence time of the laydowns in the heated zone was 5 minutes. The maximum temperature reached by the laydowns as they passed through the furnace was approximately 550° F. A 24% pickup of FEP 120 binder, based upon the weight of PTFE fibers, was obtained in each case.

The laydown of the thermally pretreated fibers did not shrink measurably (less than 1%) during the fusion step. The laydown of fibers not thermally pretreated shrunk an average of 28% during the fusion step and the resulting structure was wrinkled.

EXAMPLE 2

Into a tank, having an internal diameter of 30 inches and an available liquid depth of 23 inches was placed with stirring, 420 grams of Carbopol 941 solids and sufficient deionized water to make up 300 liters. The mixture was stirred continuously while 18 milliliters of 29% by weight aqueous ammonium hydroxide was added and mixing continued until the viscosity of the mixture reached 1,875 centipoise. The resulting mixture had a pH of about 5.5. The stirring was carried out by means of a Cowles mixer having a 10 inch diameter blade operated at 3,105 ft/min at the tip of the blade, i.e., the rate of rotation was about 1,200 rpm.

Into the mixture of Carbopol 941, water, and ammonia were added with stirring 672 grams of thermally bleached polytetrafluoroethylene fibers having diameters of 25.4 micrometers and lengths of 0.18 inch over a period of four minutes. The concentration of the fibers in the resulting dispersion was 2.24 grams per liter. The stirring was carried out with the Cowles stirrer operating at a tip speed of 3,625 ft/min (about 1,400 rpm). The stirring was continued for about 50 minutes in which time the fibers exhibited no evidence of aggregation and the viscosity of the liquid in the dispersion was about 550 centipoise, i.e., a portion of the liquid was removed by straining out the fibers and the viscosity measured as 550 centipoise using a Brookfield viscometer with a number 2 spindle operating at a speed of 12.

A portion of the stabilized dispersion of PTFE fibers was removed from the tank and transferred to a laydown table comprised of a structure with sidewalls and a base on which an impervious plastic sheet covered a foraminate glass cloth which in turn was placed over a stainless steel wire mesh supported on a stainless steel plate having drainage holes. After placing the stabilized dispersion of PTFE fibers on the laydown table (on top of the impervious plastic sheet), the plastic sheet was removed and a partial vacuum equivalent to 20 inches of water was drawn on the underside of the laydown table to remove water from the laydown. The pressure differential decreased from 20 inches of water to a pressure differential of 9 inches of water as the liquid was removed.

The partially de-watered laydown having a length of about 4 feet and a width of about 5 inches was then dried to constant weight under an infrared heat source for about 6 minutes.

The dried laydown was sprayed with an FEP 120 emulsion having a concentration of 11% FEP 120 solids by weight with the individual FEP 120 particles making up the emulsion having diameters ranging from about 0.1 to about 0.2 micrometer. A spray bottle was used to apply the emulsion to the dried laydown. The weight of the dried laydown prior to addition of the FEP 120 emulsion was 9.8 grams per square foot. Twenty milliliters of solution was used to provide an even coating. The laydown was dried under an infrared heat source. The laydown was then lifted up, turned over and laid back down on its support and an additional 20 milliliters of solution was applied by spraying. The laydown was then dried again. The FEP 120 treated laydown was cured or fused by passing it through a belt furnace set at 600° F. for 5 minutes. The maximum temperature reached by the laydown was approximately 550° F.

The resulting structure had a weight of 12.2 grams per square foot representing 9.8 grams per square foot of PTFE fibers and 2.4 grams per square foot of the FEP 120 binder, corresponding to 24.5 weight percent FEP based on the weight of PTFE. The structural integrity or strength of the porous fibrous structure prepared as described above was determined by pulling hourglass-shaped pieces of the structure under controlled conditions to measure the force required to break specimens of the structure. Specifically, samples 4 inches long and 1¼ inches wide at each end tapering in the center to a piece ½ inch wide were subjected to increasing force until the breaking or rupture point was reached. The results obtained and denoted as the breaking load (strength) in grams per inch of width are set out in Table III below. Also set out in Table III is the tensile strength calculated based on the cross sectional area of the sample tested.

TABLE III

| Specimen Number | Thickness (mils) | Breaking Load (grams) | Width of Test Where Break Occurred (inches) | Breaking Load (grams/inch of width) | Tensile Strength (lb/in$^2$) |
| --- | --- | --- | --- | --- | --- |
| Longitudinal* | | | | | |

TABLE III-continued

| Specimen Number | Thickness (mils) | Breaking Load (grams) | Width of Test Where Break Occurred (inches) | Breaking Load (grams/inch of width) | Tensile Strength (lb/in$^2$) |
|---|---|---|---|---|---|
| Specimens | | | | | |
| 1 | 30.2 | 931.7 | .56 | 1663.8 | 121.3 |
| 2 | 30.4 | 804.9 | .55 | 1463.5 | 106.0 |
| Average | 30.3 | 868.3 | .56 | 1563.7 | 113.7 |
| Transverse** Specimens | | | | | |
| 3 | 30.6 | 804.6 | .56 | 1436.8 | 103.4 |
| 4 | 30.7 | 805.5 | .52 | 1549.0 | 111.1 |
| Average | 30.7 | 805.1 | .54 | 1492.9 | 107.3 |

*Specimens taken from the laydown such that their 4 inch length was parallel to the 4 foot length of the specimen.
**Specimens taken from the laydown such that their 4 inch length was transverse or at right angles to the 4 foot length of the laydown.

As can be seen from Table I, the structures formed had good tensile strength. Void volume was 91%.

We claim:

1. A porous, fibrous fluorocarbon structure comprising (1) polytetrafluoroethylene fibers having lengths in the range of from about 4,500 to about 8,500 micrometers, diameters in the range of from about 15 to about 35 micrometers, and aspect ratios of at least about 100, and (2) a fluorinated ethylene-propylene copolymer binder, said structure having a void volume in the range of from about 50 to about 95 percent, a strength of from about 500 to about 2,500 grams per inch of width, a thickness in the range of from about 5 to about 20 mils, a weight of from about 3 to about 25 grams per square foot, an air pressure drop of from about 0.0025 to about 0.1 inch of water at a flow rate of 28 standard cubic feet per minute per square foot of the fibrous structure, and wherein said binder is present in said structure in an amount of from about 10 to about 35 percent by weight of based on the weight of said fibers.

2. The structure of claim 1 wherein the liquid cross flow of isopropyl alcohol having a viscosity of 2.1 centipoise is at least about 2.5 cc/min/psi, the air cross flow rate is at least about 500 cc/min/psi, and the Youngs modulus of said structure is relatively constant for varying thicknesses of said structure.

3. A porous, fibrous fluorocarbon structure comprising polytetrafluoroethylene fibers and a fluorocarbon binder, said structure having a void volume in the range of from about 40 to about 99 percent, a strength of from about 200 to about 6,000 grams per inch of width, and an air pressure drop of from about 0.0025 to about 0.1 inch of water at a flow rate of 28 standard cubic feet per minute per square foot of the fibrous structure.

4. The structure of claim 3 wherein said binder is present in said structure in an amount of from about 5 to about 45 percent by weight based on the weight of said fibers.

5. The structure of claim 3, wherein said fibers were preshrunk prior to incorporation into said structure.

6. The structure of claim 5 wherein said fibers were preshrunk by thermal bleaching.

7. The structure of claim 5 wherein said fibers have lengths in the range of from about 1,000 to about 20,000 micrometers, diameters in the range of from about 5 to about 50, and an aspect ratio of at least about 100.

8. The structure of claim 3 wherein said binder is a fluorinated ethylene-propylene copolymer.

9. The structure of claim 8 wherein said binder is a copolymer of tetrafluoroethylene and hexafluoropropylene.

10. A method of forming a porous, fibrous structure comprising polytetrafluoroethylene fibers and fluorocarbon binder, which method comprises:
(a) preparing a stabilized dispersion comprising polytetrafluoroethylene fibers, a stabilizing agent, and a liquid carrier;
(b) laying down said dispersion on a support and removing at least a portion of said carrier;
(c) applying an emulsion of a fluorocarbon binder to the laydown; and
(d) curing the fluorocarbon binder.

11. The method of claim 10 wherein the laydown is at least partially dried prior to application of said emulsion.

12. The method of claim 11 wherein after the curing of said binder one or more additional applications of said emulsion is carried out with drying after each such additional application and wherein said laydown is cured after the final application of said emulsion.

13. The method of claim 11 wherein said laydown is dried after the application of said emulsion and prior to said curing.

14. The method of claim 13 wherein the application of said emulsion to said laydown and the drying of said laydown after said application is repeated one or more times prior to curing said binder.

15. The method of claim 11 wherein said fluorocarbon binder is a fluorinated ethylene-propylene copolymer and said stabilized dispersion is prepared by:
(i) admixing a stabilizing agent/binder with a liquid carrier in an amount to provide a concentration of from about 0.4 to about 4 grams per liter of the mixture of said stabilizing agent/binder and said liquid carrier, and
(ii) dispersing said fibers in the mixture of liquid carrier and stabilizing agent/binder in an amount to provide from about 0.5 to about 20 grams of said fibers per liter of the resulting stabilized dispersion of said fibers, said stabilizing agent/ binder, and said liquid carrier; and wherein the mixture of said liquid carrier and said stabilizing agent/binder has a viscosity of from about 800 to about 20,000 centipoise and the concentration of said binder in said emulsion is from about 0.5 to about 25 weight percent.

16. The method of claim 15 wherein said fluorocarbon binder is a fluorinated ethylene-propylene copolymer and said stabilized dispersion is prepared by:
(i) admixing a stabilizing agent/binder with a liquid carrier in an amount to provide a concentration of from about 1 to about 2 grams per liter of the mixture of said stabilizing agent/binder and said liquid carrier, and (ii) dispersing said fibers in the mixture of liquid carrier and stabilizing agent/binder in an amount to provide from about 1 to about 5 rams of said fibers per liter of the resulting stabilized dispersion of said fibers, said stabilizing agent/ binder, and said liquid carrier, and wherein the mixture of said liquid carrier and said stabilizing agent/binder has a viscosity of from about 1,200 to about 6,000 centipoise and the concentration of said binder in said emulsion is from about 5 to about 15 weight percent.

17. The method of claim 16 wherein the particles of said fluorocarbon binder in said emulsion have sizes in the range of from about 0.05 to about 1 micrometer.

18. The method of claim 11 wherein said fibers are preshrunk prior to incorporation into said dispersion.

19. The method of claim 18 wherein said fibers are preshrunk and bleached prior to incorporation into said dispersion by thermal treatment.

20. A method of forming a porous, fibrous structure comprising polytetrafluoroethylene fibers and a fluorocarbon binder, which method comprises:

(a) preparing a stabilized, aqueous dispersion comprising polytetrafluoroethylene fibers, a stabilizing agent/binder and water;
(b) laying down said dispersion on a foraminous substrate and removing at least a portion of the water;
(c) applying a fluorocarbon binder emulsion to one side of the laydown;
(d) drying the laydown;
(e) applying said fluorocarbon binder emulsion to the other side;
(f) drying the laydown again; and
(g) setting or curing the fluorocarbon binder.

21. The method of claim 20 wherein said fibers are preshrunk prior to incorporation into said dispersion.

22. The method of claim 21 wherein after curing of said fluorocarbon binder the resulting structure is treated to remove extractables.

23. The method of claim 21 wherein said fluorocarbon binder is a fluorinated ethylene-propylene copolymer.

24. The method of claim 23 wherein the particles of said fluorocarbon binder in said emulsion have sizes in the range of from about 0.05 to about 1 micrometer.

* * * * *